United States Patent [19]
Ohya et al.

[11] Patent Number: 5,553,190
[45] Date of Patent: Sep. 3, 1996

[54] SPEECH SIGNAL TRANSMISSION METHOD PROVIDING FOR CONTROL

[75] Inventors: Tomoyuki Ohya; Shinji Uebayashi, both of Yokosuka; Toshio Miki, Yokohama, all of Japan

[73] Assignee: NTT Mobile Communications Network, Inc., Tokyo, Japan

[21] Appl. No.: 240,391

[22] Filed: May 10, 1994

Related U.S. Application Data

[63] Continuation of Ser. No. 964,899, Oct. 22, 1992, abandoned.

[30] Foreign Application Priority Data

Oct. 28, 1991 [JP] Japan ................................. 3-307229

[51] Int. Cl.$^6$ ........................................ G10L 3/02
[52] U.S. Cl. ........................ 395/2.1; 395/2.28; 395/2.35
[58] Field of Search .......................... 381/29.51; 395/2, 395/2.1, 2.28, 2.35, 2.36, 2.37; 379/410; 370/60.1, 81

[56] References Cited

U.S. PATENT DOCUMENTS

| | | | |
|---|---|---|---|
| 4,326,293 | 4/1982 | DeMan et al. | 455/72 |
| 4,630,262 | 12/1986 | Callens et al. | 370/81 |
| 4,712,235 | 12/1987 | Jones, Jr. | 379/410 |
| 5,018,136 | 5/1991 | Gollub | 370/60.1 |
| 5,483,556 | 1/1996 | Pilan et al. | 375/340 |

FOREIGN PATENT DOCUMENTS

| | | | |
|---|---|---|---|
| 0018256 | 10/1980 | European Pat. Off. | H04B 1/46 |
| 0116975 | 8/1984 | European Pat. Off. | H04B 12/04 |

OTHER PUBLICATIONS

Patent Abstracts of Japan, No. 14234 (E-0929), May 17, 1990, JP-A-2062135 (NTT).

Lin et al., *Error control Coding: Fundamentals and Applications*, Prentice Hall, 1989, pp. 58, 59, 81 and 98.

Furui, *Digital Speech Processing, Synthesis, and Recognition*, Tokai University Press, 1985, pp. 85–86.

Primary Examiner—Allen R. MacDonald
Assistant Examiner—Richemond Dorvil
Attorney, Agent, or Firm—Pollock, Vande Sande & Priddy

[57] ABSTRACT

A method of communicating a speech signal over a communication medium which utilizes VOX (Voice Operated Transmitter) control, and a speech signal transmitting unit and a speech signal receiving unit used in said method. The speech signal includes at least one speech-active duration in which actual speech exists and one silent duration in which no actual speech exists. At a transmitting side, the speech signal is analyzed for each of successive frames thereof to determine whether each frame is in the speech-active duration, and is coded for each of successive frames thereof to produce a series of successive coded data of the speech signal. Then, in response to the detection of a speech starting frame of the speech-active duration, the coded data of the speech starting frame is switched to a preamble, and the preamble and the successive coded data subsequent to the speech starting frame are transmitted in the form of a series of successive frames. At a receiving side, the preamble is detected and the decoded results of the coded actual speech data subsequent to the detected preamble are output as a speech signal. When a predetermined number of successive coded actual speech data have been detected without having detected a preamble preceding thereto, it is decided that the decoded results of the coded actual speech data are in a speech-active duration and the decoded results are outputted as a speech signal.

18 Claims, 8 Drawing Sheets

SPEECH SIGNAL TRANSMISSION METHOD PROVIDING FOR CONTROL

This application is a continuation of Ser. No. 07/964,899, filed on Oct. 22, 1992, now abandoned.

BACKGROUND OF THE INVENTION

The present invention relates generally to a method and apparatus for transmitting speech signals in a digital radio communication system, and is specifically concerned with a speech signal transmitting method and apparatus which utilizes what is called VOX (Voice Operated Transmitter) control in which in transmitting speech signals, only for a speech-active duration (a time period when speech actually exists) the transmission of the speech signal is carried out, in other words, the power for the transmitter is turned on, and for a silent duration (a time period when any speech does not exist) the power for the transmitter is turned off thereby reducing the amount of power consumed by the transmission of speech signals.

In radio equipments such as portable telephones, cordless telephones and the like, there is an increased demand for more lightweight and more compact equipment and an effective approach to satisfying that demand would be to reduce the amount of power consumed by a radio equipment thereby decreasing the capacity requirements of the battery used therein. To this end, there has been proposed a method which employs a VOX (Voice Operated Transmitter). This method is one that stops the transmission of radio waves while the talker is not actually speaking (i.e. for a silent duration) and transmits radio waves only while he is actually speaking (i.e. for a speech-active duration). For example, assuming that the speech activity factor (=speech-active duration/(speech-active duration+silent duration)) is 50%, the use of the VOX affords reduction of power consumption substantially by half that of ordinary radio equipment.

For the operation of the VOX, it is necessary to allow the receiving side to make a distinction between the speech-active duration and the silent duration. To meet this requirement, a method has been proposed in which a speech signal including at least one speech active duration (in which an actual speech exists) and one silent duration (speech pause duration in which no speech exists) is transmitted from the transmitting side by inserting, at the starting portion of a speech-active duration, a speech-active duration start information (hereinafter referred to as a preamble) which indicates the beginning of the speech-active duration in place of a coded information of the actual speech at that portion of the speech-active duration, and inserting at the end of the speech-active duration a speech-active duration end information (hereinafter referred to as a postamble) which indicates the termination of the speech-active duration, in other words, the beginning of the silent duration, respectively. The present invention utilizes this conventional method.

The application of this method to an automobile telephone system involves some problems to be solved, and in particular, substantially no study has been given the VOX system for use with a digital mobile radio communication system.

The present invention is intended to solve three problems experienced in the prior art. In the first place, since mobile communications are inevitably accompanied by channel errors, there is the possibility of the preamble being not correctly transmitted to the receiving station. In such an instance, even if a speech-active duration subsequent to the preamble can be received normally, no decoding operation can be initiated.

Another problem is as follows: With a view to making effective use of radio waves, digital mobile communications utilize various high efficiency speech coding schemes such as CELP (Code Excited Linear Predictive coding), VSELP (Vector Sum Excited Linear Predictive coding), TC-WVQ (Transform Coding with Weighted Vector Quantization), etc. In these schemes the speech is partitioned into short time frames of about 20 mS duration, for instance, and is coded for each frame, and it is conventional to use a method called "prediction" which utilizes a previous speech sequence to reproduce or regenerate the subsequent speech in order to allow high efficiency compression of the speech. In the predictive coding method the decoding of coded speech data of each frame calls for the result of decoding of the immediately preceding speech frame. Hence, it is unavoidable in the prior art that a speech starting frame corresponding to the beginning of the speech-active duration, which is transmitted directly after the preamble which is not a speech frame, cannot correctly be received at the receiving station, allowing an abnormal sound to be produced. Moreover, mobile communication terminals are often used outdoors in an environment with background noise. It is unnatural, however, that such background noise cannot be heard at the receiving station during the suspension of transmission which is one of VOX functions. No measures have been taken against these problems.

SUMMARY OF THE INVENTION

A first object of the present invention is to provide a speech signal transmitting method and apparatus which ensure the initiation of decoding at the receiving end.

A second object of the present invention is to provide a speech signal transmitting method and apparatus which prevent the production of an abnormal sound at the beginning of a decoded speech.

A third object of the present invention is to provide a speech signal transmitting method and apparatus which permits the generation of natural background noise at the receiving end for the silent duration during which transmission is suspended.

According to a first aspect of the present invention, the transmitting side sends a coded speech signal appended with an error detecting code and even if no preamble can be detected at the receiving end, it is judged that the receiving end failed to receive the preamble when it continuously detects speech frames of coded speech data a plurality of times, then the receiving end is allowed to carry out the decoding operation.

According to a second aspect of the present invention, the power level of an input speech of the speech starting frame at the beginning of the speech-active duration is suppressed at the transmitting side. Also at the receiving end, the power level of the frame judged as the beginning of the speech-active duration may preferably be suppressed.

According to a third aspect of the present invention, the transmitting side sends postambles at predetermined regular intervals in a silent duration and coded background noise in the frames following the postambles. At the receiving end, upon each reception of the coded background noise immediately succeeding each postamble, power information and prediction coefficients contained in the coded background noise update corresponding ones in a storage, and a random pattern generated as a residual signal and the prediction coefficients and power information read out of the storage for each frame period are used to produce the background noise.

BRIEF DESCRIPTION THE DRAWINGS

DESCRIPTION OF THE PREFERRED EMBODIMENTS

Figure 1:
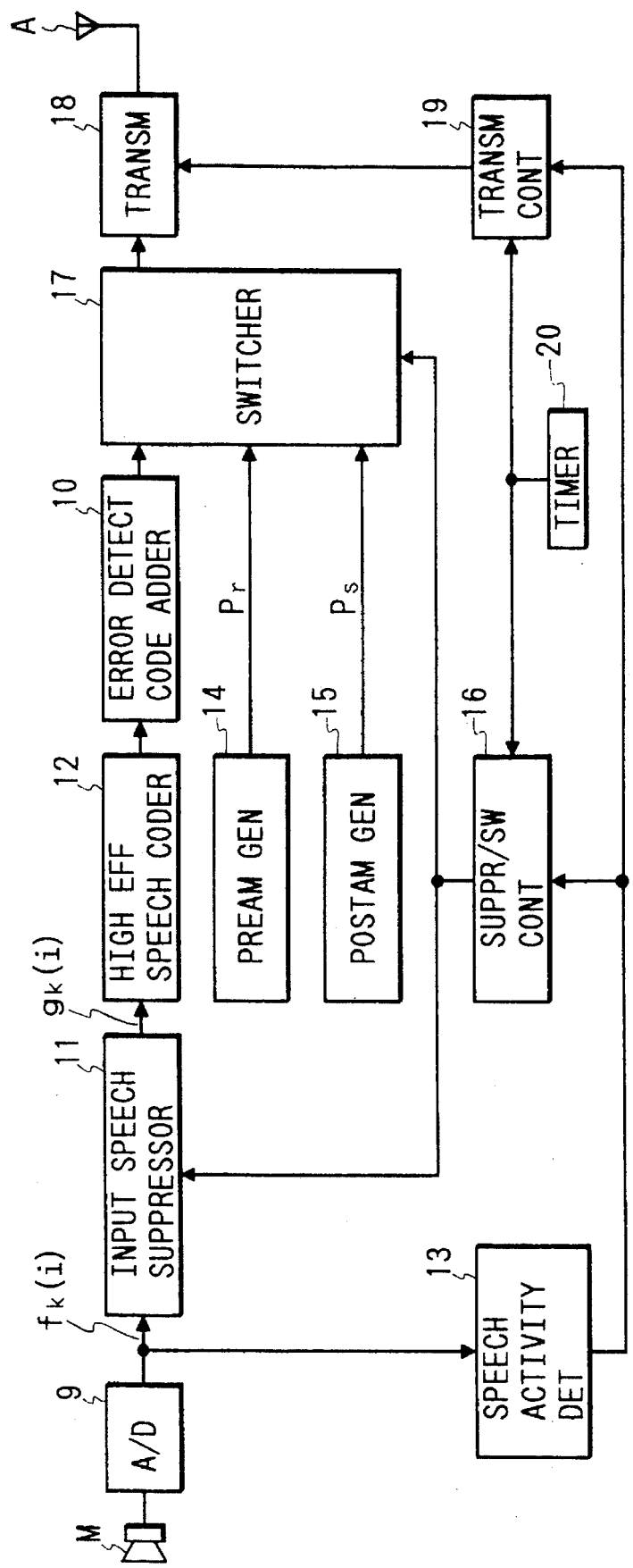
FIG. 1 is a block diagram of a transmitting unit for the practice of the present invention.

FIG. 1 illustrates in block form a transmitting unit according to the present invention. Reference character M denotes a microphone and reference numeral 9 indicates an A/D converter, 11 an input speech suppressor, 12 a high efficiency speech coder, 10 an error detecting code adder, 13 a speech activity detector, 14 a preamble generator, 15 a postamble generator, 16 a suppressor/switcher controller, 17 a data switcher, 18 a transmitter, 19 a transmission controller, 20 a timer, and A an antenna.

Figure 2:
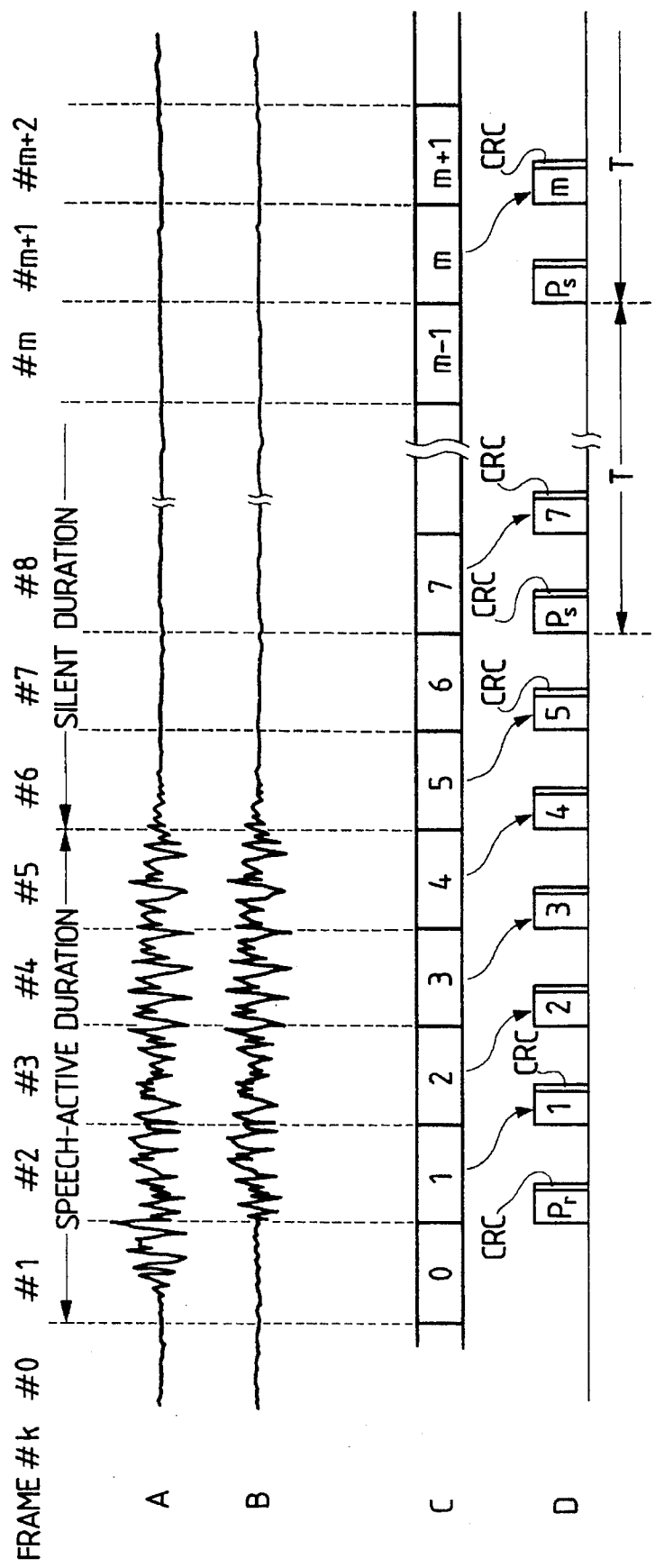
FIG. 2 is a timing chart for explaining the operation of the unit depicted in FIG. 1.

Referring now to FIG. 2, the transmitting operation of the transmitting unit of FIG. 1 will be described. A speech having at least one speech-active duration and one silent duration to be transmitted is input into the microphone M, wherein it is converted to an analog electric speech signal. The speech signal is converted by the A/D converter 9 with a sampling period of, say, 8 KHz to a digital speech signal, which is sent to the high efficiency speech coder 12 wherein the digital speech signal is coded frame by frame for a series of successive frames segmented. Each of the successive frames has a time period of, for example, 20 ms. Then the successive coded data of the digital speech signal is transmitted in a frame-structure form i.e., in the form of successive frame signals.

The speech activity detector 13 for detecting a speech active duration calculates the mean power of, for example, each frame of the input digital speech signal and decides that when the power level of a frame is below a predetermined threshold value, the frame is one in a silent duration, and when the mean power level of that frame is above the threshold value, the frame is one in a speech-active duration. In the field of speech transmission there are known various methods of determining whether the input signal is a speech-active duration or not. Any of the known methods can be used in the present invention. The calculation of the mean power for each frame and the comparison of the calculated value with the threshold value can be done within a negligibly short time at the end of the frame.

Now, let it be assumed that an input signal applied to the input speech suppressor 11 has such a waveform as shown in FIG. 2, Row A. (This waveform is depicted as an analog waveform which is different from the digital waveform converted by the A/D converter 9, for easy understanding.) The input speech suppressor 11 operates to suppress only the power level of a first frame of the digital speech signal inputted thereto and supplies the suppressed first frame to the high efficiency speech coder 12. This first frame is the starting frame of the speech-active duration of the digital speech signal which is segmented into a series of successive frames and in which the speech signal has changed from the speech pause, namely the silent duration, to the actual speech, namely the speech-active duration (which frame will be hereinafter referred to as a speech starting frame, which is a frame #1 in FIG. 2 example), to the extent of, for example, a background noise level in the silent duration by a method described later. Also, the input speech suppressor 11 operates to give the subsequent remaining frames of the speech signal to the high efficiency speech coder 12 without suppressing the power levels thereof at all regardless of whether they are in the speech-active duration or in the silent duration. In all of the other speech-active and silent durations the power level of the input signal is not suppressed and the signal is applied intact to the high efficiency speech coder 12.

The high efficiency speech coder 12 codes the output of the input speech suppressor 11 for each frame. The output speech signal from the input speech suppressor 11 for each frame #k (where k is an arbitrary integer), shown in FIG. 2, Row B, is coded in the next frame #k+1 as depicted in FIG. 2, Row C. For high efficiency speech coding, the present invention utilizes the aforementioned coding techniques, such as CELP, VSELP and TC-WVQ, and implements the speech coding on the basis of prediction coefficients, power information and a residual for each frame. In case of decoding the coded speech signal coded by use of the high efficiency speech coding method utilizing the prediction coefficients, at the receiving end, it is necessary at the receiving end to use the decoded results of the previous frame in order to decode the received code of the current frame. When the speech starting frame is received, however, no correct decoding can be done, since the preceding frame was in the silent duration and was not transmitted, and in this instance, an abnormal sound is produced. On the contrary the level of such an abnormal sound at the receiving end could be lowered by suppressing the power level of the speech starting frame at the transmitting side as in the case of this embodiment.

The output speech coded data from the high efficiency speech coder 12 is provided to the error detecting code adder 10, wherein it is appended with an error detecting code (such as a cyclic redundancy check code) for each frame. On the other hand, the preamble generator 14 and the postamble generator 15 output a preamble Pr and a postamble Ps of predetermined bit patterns, respectively, after appending to them such error detecting codes as the preamble and the postamble are decided to be errors, that is, are decided not to be the coded speech data when they are detected at the receiving end without fail (see FIG. 2, Row D). Such an error detecting code is well-known in the field of digital signal transmission.

The data switcher 17 supplies therethrough, from the preamble generator 14 to the transmitter 18, the preamble Pr which indicates that the transmission of the speech signal will begin in a frame #2 subsequent to the speech starting frame (#1 in FIG. 2, for instance) in which the input signal changed from the silent duration to the speech-active duration and provides coded speeches of speech-active duration frames #2–#5 succeeding the speech starting frame #1 to the transmitter 18 in transmission frames #4–#7 (Row D), respectively. For instance, in the case where the input signal changed from the speech-active duration to the silent duration in the frame #6, the speech coded data of the speech frame #5 is transmitted in the transmission frame #7, after which the postamble Ps is output in the transmission frame #8. In the next transmission frame #9 the coded speech (background noise) of the silent duration frame #7 is provided to the transmitter 18. The transmission controller 19 stops the transmitting operation of the transmitter 18 from the frame #10 when the speech-active detector 13 detected the start of the silent duration in the frame #6. The transmitter 18 transmits a bit string of coded data of each frame, in a burst-like form, within a period shorter than the speech frame period.

Also for the silent duration, as shown in frames #m and #m+1 in FIG. 2, the transmission controller 19 and the suppressor/switcher controller 16 are started respectively at time intervals of T preset in the timer 20, whereby the postamble Ps signal from the postamble generator 15 and the coded speech of the silent duration or background noise, provided from the high efficiency speech coder 12, are transmitted from the transmitter 18 in two consecutive transmission frames #m+1 and #m+2.

The suppressor/switcher controller 16 controls the data switcher 17 and the input speech suppressor 11 on the basis of the result of detection by the speech detector 13 and a time signal from the timer 20. At the end of each frame #k, that is, at the start of the next frame #k+1, the speech detector 13 determines whether the frame #k is a speech-active duration, as described above, and if the frame #k is a speech starting frame, then the suppressor/switcher controller 16 controls, in the frame #k+1, the input speech signal suppressor 11 to suppress the level of the frame #k and the data switcher 17 to output the preamble Pr. When a change from the speech-active to the silent duration is detected at the end of the frame #k, the suppressor/switcher controller 16 controls the data switcher 17 to output the postamble Ps in the frame #k+2 and the speech code (background noise coded data) of the frame #k+1 in the frame #k+3.

By suppressing and providing the input speech to the coder at the transmitting side in the frame in which the speech-active duration begins as described above, the volume of the speech starting frame in which an abnormal sound is produced decreases at the receiving end.

Figure 3:
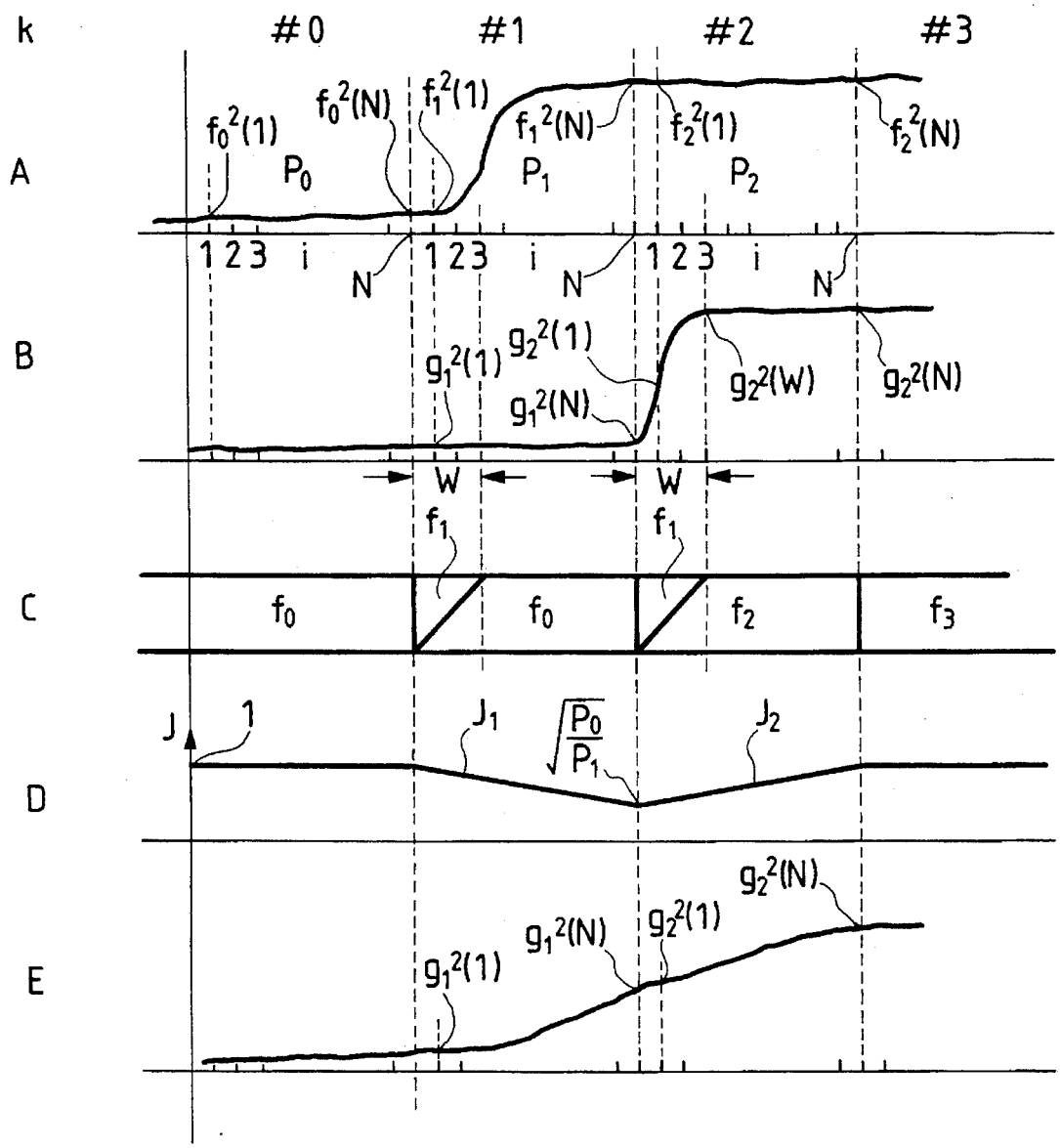
FIG. 3 is a timing chart for explaining a speech suppressing operation.

In FIG. 3, Rows A and B show, on an enlarged scale, the relationship between the power of an input speech signal f(i) into the input speech suppressor 11 in the frame #0, #1 and #2, that is, squares, $f^2(i)$, of sample values of the speech signal, and the power $g^2(i)$ of the suppressed speech output g(i) so as to explain a first concrete example of the operation of the input speech suppressor 11 which suppresses the power level of the speech signal. This example shows the case where the input speech suppressor 11 combines sample values in the current frame and sample values in a certain previous frame at the rate corresponding to each sample position in the frames and then provides the combined output in the speech starting frame in which the input speech changes from the silent to the speech-active duration, as schematically depicted on Row C in FIG. 3.

In FIG. 3, reference character k represents the frame number and i the sample number in each frame, where i=1, 2, ..., N. As referred to previously, the input speech suppressor 11 does not suppress most input samples $f_0(i)$ of the silent duration of the frame #0 but outputs them as samples $g_0(i)$ at the original levels. In the frame #1 in which the speech-active duration begins, the suppressor 11 suppresses input speech samples $f_1(i)$ and outputs them as $g_1(i)$ and, in the frame #2 which is the second frame in the speech-active duration, the suppressor 11 outputs most input speech samples $f_2(i)$ almost intact as $g_2(i)$. It is assumed that this example uses, as the output $g_1(i)$ suppressed in the frame #1, the input speech samples $f_0(i)$ of the immediately preceding frame #0 which is a silent duration. Moreover, in order that the outputs $g_0(i)$, $g_1(i)$ and $g_2(i)$ of the suppressor 11 may be smoothly-concatenated between adjacent frames #0 and #1 and between #1 and #2, the suppressed outputs are calculated by performing the following processing of the sample values $f_1(i)$, and $f_2(i)$ in a window W (in which the practical number of samples W may be around 10, for example, though in FIG. 3 the number W is shown to be 3) sufficiently shorter than the frame length (N=160), at the beginnings of the frames #1 and #2.

$$g_1(i) = \frac{W-i}{W} \times f_1(i) + \frac{i}{W} \times f_0(i) \text{ for } 1 \leq i \leq W \tag{1}$$

$$g_1(i)=f_0(i) \text{ for } W+1 \leq i \leq N \tag{2}$$

$$g_2(i) = \frac{W-i}{W} \times f_1(i) + \frac{i}{W} \times f_2(i) \text{ for } 1 \leq i \leq W \tag{3}$$

$$g_2(i)=f_2(i) \text{ for } W+1 \leq i \leq N \tag{4}$$

In this example, the input speech suppressor 11 outputs $g_k(i)=f_k(i)$ in a frame #k≤3.

Figure 4:
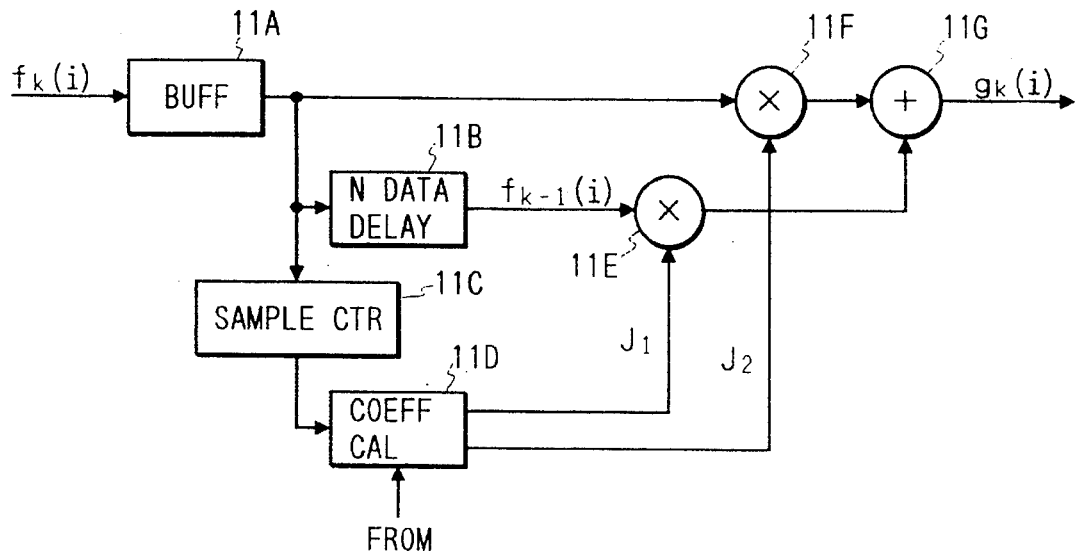
FIG. 4 is a block diagram illustrating an example of an input speech suppressor.

FIG. 4 illustrates in block form an example of the construction of the input speech suppressor 11 which performs the above operation. When all input speech samples $f_k(i)$ (where i=1, 2, ..., N) in the frame #k are loaded into a buffer 11A, they are immediately read out thereof one after another and input into a data delay circuit 11B composed of N stages of shift registers, while at the same time they are provided to a sample counter 11C. Since samples $f_{k-1}(i)$ (where i=1, 2, ..., N) in the preceding frame have already been input in the delay circuit 11B, they are output therefrom as the samples $f_k(i)$ of the current frame #k are input thereinto. The sample counter 11C counts the samples from 1 to N.

Based on the output i from the sample counter 11C, a coefficient calculator 11D calculates coefficients $J_1$ and $J_2$ for the speech starting frame #k (k=1 in FIG. 3) and the next frame #k+1 by the following equations and provides the coefficients $J_1$ and $J_2$ to multipliers 11E and 11F, respectively.

Speech starting frame #k:

$$J_1=i/W, J_2=(W-i)/W \text{ for } 1 \leq i \leq W \tag{5}$$

$$J_1=1, J_2=0 \text{ for } W+1 \leq i \leq N \tag{6}$$

Frame #k+1:

$$J_1=(W-i)/W, J_2=i/W \text{ for } 1 \leq i \leq W \tag{7}$$

$$J_1=0, J_2=0 \text{ for } W+1 \leq i \leq N \tag{8}$$

Other frames:

$$J_1=0, J_2=1 \text{ for } 1 \leq i \leq N \tag{9}$$

In the multiplier 11e each sample $f_{k-1}(i)$ of the preceding frame #k-1 from the delay circuit 11B is multiplied by the coefficient J1, and in the multiplier 11F each sample $f_k(i)$ of the current frame #k from the buffer 11A is multiplied by the coefficient $J_2$. The multiplied outputs are added together in an adder 11G, from which the added output is provided as the suppressed output $g_k(i)$ of the input speech suppressor 11. Incidentally, it is assumed that the time from the readout of N input speech samples from the buffer 11A to the completion of the calculation of the suppressed outputs $g_k(i)$ is shorter than the sampling period.

The input speech suppressor 11 may also be adapted to perform its operation as described hereinbelow. The level of the input speech in the speech starting frame (#1) in which the speech changes from the silent duration to the speech-active duration and in the next speech-active frame (#2) is suppressed using a coefficient $(P_0/P_1)^{1/2}$ which is determined by the speech power P1 available from the speech sample data $f_1(i)$ of the speech starting frame (#1) and the speech power $P_0$ available from the speech sample data $f_0(i)$ of the immediately preceding frame (#0). The coefficient is given a weight which sequentially varies with the sample position i in each of the frames #1 and #2, as shown on Row D in FIG. 3. The input speech power Pk of the frame #k is expressed by the following equation:

$$Pk = \sum_{i=1}^{N} f_k^2(i) \qquad (10)$$

Letting the input speech powers in the frame #0 and #1 on Row A in FIG. 3 be represented by $P_0$ and $P_1$, respectively, the outputs $g_1(i)$ and $g_2(i)$ of the input speech suppressor 11 for the speech starting frame #1 and the subsequent speech-active frame #2 are expressed as follows:

$$g_1(i) = J_1(i)f_1(i), \, J_1(i) = \frac{N-i}{N} + \sqrt{\frac{P_0}{P_1}} \cdot \frac{i}{N} \qquad (11)$$

$$g_2(i) = J_2(i)f_2(i), \, J_2(i) = \sqrt{\frac{P_0}{P_1}} \cdot \frac{N-i}{N} + \frac{i}{N} \qquad (12)$$

where: i=1, 2, . . . , N

In the other frames #k, $g_k(i)=f_k(i)$. As is evident from the above, an N-th suppressed sample output in the frame #1 is $g_1(N)=(P_0/P_1)^{1/2}f_1(N)$ and a 1st suppressed sample output $g_2(1)$ is as follows:

$$g_2(l) = \left\{ \sqrt{\frac{P_0}{P_1}} \cdot \frac{N-l}{N} + \frac{l}{N} \right\} f_2(l) \approx \sqrt{\frac{P_0}{P_1}} \cdot f_2(l) \qquad (13)$$

As is apparent from Row E in FIG. 3, $f_1(N) \cong f_2(1)$, and hence $g_1(N) \cong g_2(1)$. Thus, it will be seen that the suppressed outputs for the frames #1 and #2 are smoothly concatenated in a gentle slope as depicted on Row E in FIG. 3.

Figure 5:
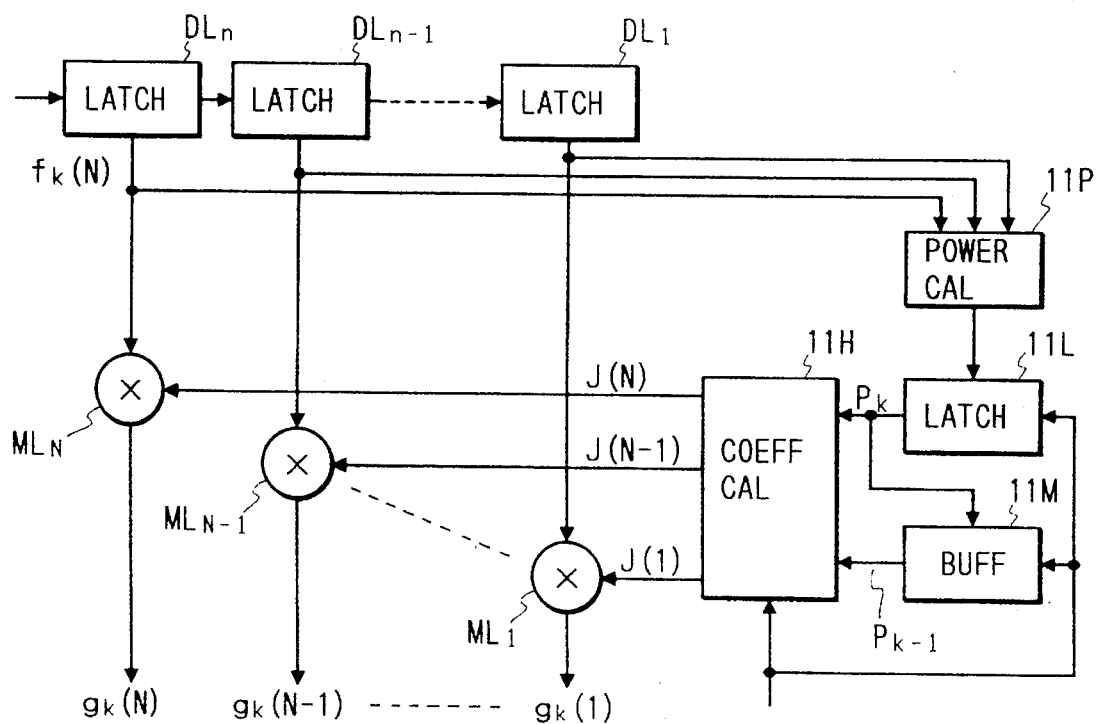
FIG. 5 is a block diagram illustrating another example of the input speech suppressor.

FIG. 5 shows in block form an example of the construction of the input speech suppressor 11 for the above-described operation. The input speech samples $f_k(i)$ in the frame #k are sequentially loaded into N stages of cascade-connected data latches $DL_N, DL_{N-1}, \ldots, DL_1$, and when the inputting of the N samples of one frame has been completed, samples $f_k(1), f_k(2), \ldots, f_k(N)$ are held in the data latches $DL_1, DL_2, \ldots, DL_N$, respectively. A power calculator 11P calculates the power Pk of the input speech signal of the frame #k from the outputs of these data latches. The power Pk thus calculated is held in a latch 11L. In the case where the output of the suppressor controller 16 (see FIG. 1) indicates that the input speech frame #k is a speech starting frame, the power $P_{k+1}$ of the next frame #k+1 is not loaded into the latch 11L and the contents $P_k$ and $P_{k-1}$ of the latches 11L and 11M are retained. When the speech frame #k is a speech starting frame (k=1 in FIG. 3), a coefficient calculator 11H calculates the coefficients $J_k(i)$ in Eq. (11) with respect to i' from 1 to N and provides the calculated coefficients to multipliers $ML_1$ to $ML_N$. Each multiplier $ML_i$ multiplies the output $f_k(i)$ from the corresponding data latch $DL_i$ by the coefficient $J_k(i)$ to obtain a suppressed sample $g_k(i)$. The suppressed samples $g_k(i)$ (where i=1, 2, . . . , N) thus obtained are simultaneously provided to the high efficiency speech coder 12. In the frame #k+1 (#2 in FIG. 3) subsequent to the speech starting frame #k similar calculations are performed using Eq. (12) and the powers $P_0$ and $P_1$ of the frames #0 and #1, which are not updated but are retained in the latches 11L and 11M, are used for the calculations to obtain suppressed samples $g_{k+1}(i)$.

Figure 6:
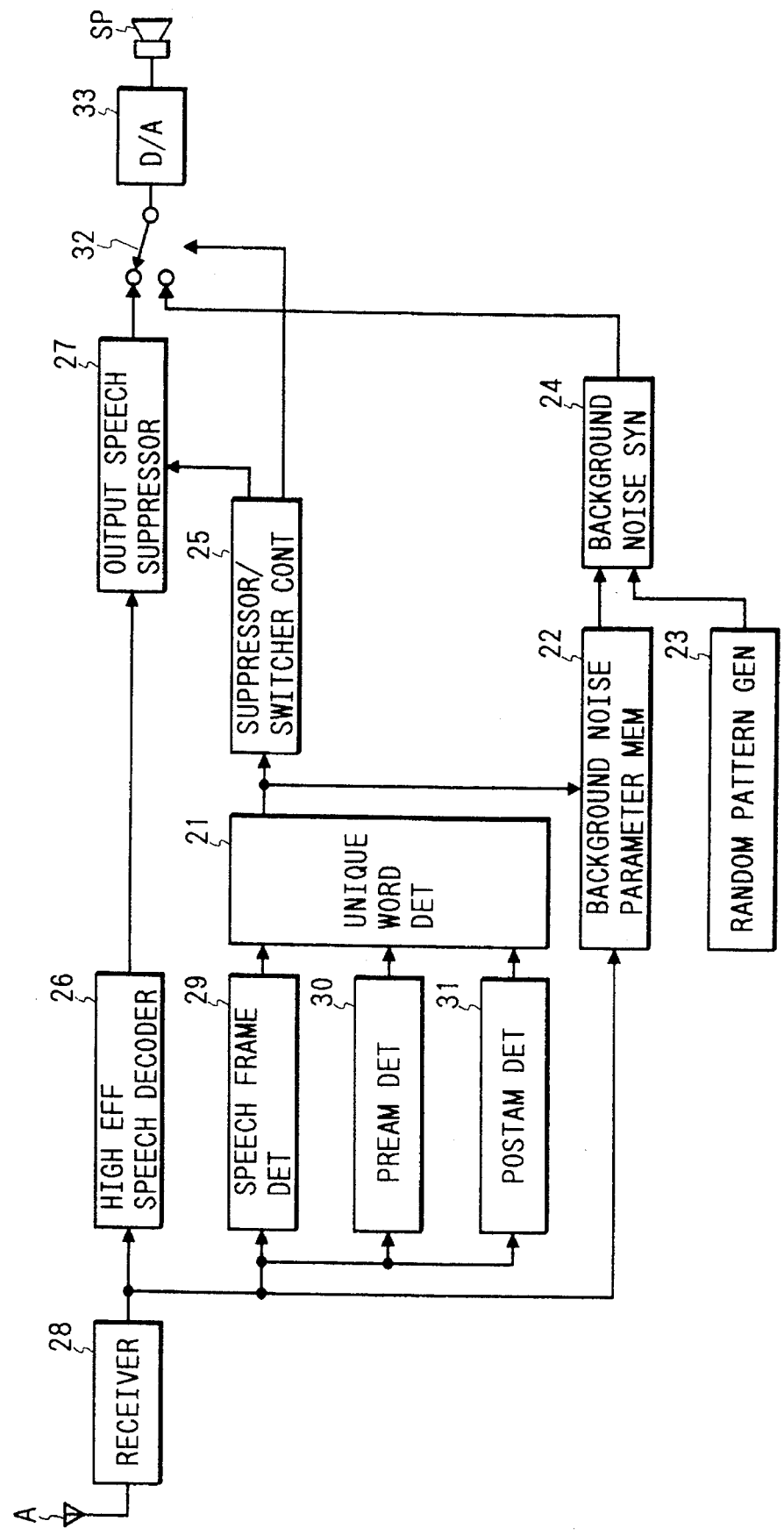
FIG. 6 is a block diagram of a receiving unit for use with the transmitting unit of FIG. 1.

FIG. 6 illustrates in block form an embodiment of the receiving unit corresponding to the transmitting unit of FIG. 1. Reference character A denotes an antenna, and reference numeral 28 indicates a receiver, 26 a high efficiency speech decoder, 27 an output speech suppressor, 21 a unique word detector, 29 a speech frame detector, 30 a preamble detector, 31 a postamble detector, 32 a switch, 33 a D/A converter, 25 a suppressor/switcher controller, 22 a background noise parameter memory, 23 a random pattern generator, 24 a background noise synthesizer, and SPa speaker.

A description will be given, with reference to FIG. 6, of the receiving operation of the receiving unit. The coded speech signal, transmitted as a burst signal for each frame, is applied via the antenna A to the receiver 28. The coded speech signal received by the receiver 28 is provided to the high efficiency speech decoder 26 and, at the same time, to the speech frame detector 29, the preamble detector 30 and the postamble detector 31.

The high efficiency speech decoder 26 always performs a predictive decoding operation, using coded data of the received speech frame (either a speech-active frame or a background noise frame). In principle, the high efficiency speech decoder 26 has a construction which uses a received residual as an excitation source signal to drive a speech synthesis filter controlled by prediction coefficients and controls the level of the synthesized output speech by power information.

When supplied with the coded data appended with the error correcting code for each frame, the speech frame detector 29 performs an error detection processing for the coded data, and if no error is detected, it is decided that the frame is a speech frame (a speech-active frame or background noise frame), rather than the preamble or postamble. When an error is detected, it is decided that a channel error was induced or the frame is a preamble or postamble.

In the case where no speech frame is detected in the speech frame detector 29, there is the possibility of the received coded data being a preamble or postamble. The preamble detector 30 compares the received coded data with a preamble pattern and, if they match, the detector 30 outputs a preamble detected signal. Similarly, the postamble detector 31 compares the received coded data with a postamble pattern and, if they match, it outputs a postamble detected signal.

When a preamble is detected, the unique word detector 21 decides, on the basis of the detected signals from the speech frame detector 29, the preamble detector 30 and the postamble detector 31, that a speech-active duration begins at the next frame. When speech frames are detected one after another a predetermined number of times although no preamble has been detected, it is decided that a preamble has been lost by a channel error, and consequently the speech-active duration has already been started. In either case, the suppressor/switcher controller 25 controls the output speech suppressor 27 to suppress the power level of the frame directly after the decision and, at the same time, connects the switch 32 to the suppressor 27 side.

When supplied with the postamble detected signal, the unique word detector 21 decides that the speech-active duration has finished, and connects the switch 32 to the background noise synthesizer 24. According to the present invention, even if the postamble immediately after the speech-active duration is lost due to a channel error, a postamble accompanied by a background noise frame is transmitted from the transmitting side every fixed period of time T in the silent duration, and consequently, the switch 32 can be connected to the background noise synthesizer 24 side upon detection of the postamble.

In the normal decoding operation the speech signal, which is decoded by the high efficiency speech decoder 26 using, for instance, the prediction coefficients, the power information and the residual signal received, is output without being attenuated by the output speech suppressor 27, that is, without being suppressed. When the frame of the preamble is detected in the unique word detector 21, the suppressor/ switcher controller 25, which has received therefrom the detected output, controls the output speech suppressor 27 so that the power of the output speech is first attenuated substantially in the next speech starting frame and is gradually increased in the next frame. This is intended to obtain the same results as those obtainable with the input speech suppressor 11 described previously in respect of FIG. 1, that is, to prevent the production of an abnormal sound which is caused by a failure to perform correct decoding at the start of a speech-active duration at the receiving end, as mentioned previously. Hence, when the suppressor 11 is provided at the transmitting side, the suppressor 27 at the receiving end may be omitted, and vice versa. Of course, the suppressors 11 and 27 may be provided at the transmitting side and the receiving end, respectively. The suppressor 27 at the receiving end may be identical in construction with the suppressor 11 at the transmitting side.

When the suppressor 11 is not provided at the transmitting side, a speech starting frame of about the same power as that of an ordinary speech-active duration (which power is very large as compared with the background noise level) is decoded at the receiving end. By suppressing the decoded speech of the speech starting frame in the suppressor 27 at the receiving end, the production of an abnormal sound can be suppressed, but in the decoder 26 the result of decoding of the received speech starting frame must be used to decode the next speech-active frame, and consequently, the decoded speech is affected accordingly, and hence remains somewhat unnatural. Thus, it is most effective to suppress the speech starting frame by the suppressor 11 at the transmitting side, and by providing the suppressor 27 at the receiving end as well, it is possible to suppress the production of an abnormal sound in the first frame which was decided as a speech-active duration and in which the switch 32 was changed over to the suppressor 27 side, even if the preamble is lost owing to a channel error.

Upon detection of the postamble by the unique word detector 21, the background noise parameter memory 22, when indicated accordingly, stores, in the frame subsequent to the postamble, the prediction coefficients and power information included in the coded background noise (the prediction coefficients, the power information and the residual) contained in the speech signal coded by the high efficiency speech coder 12 at the transmitting side in the silent duration. This background noise parameter is repeatedly read out of the memory 22 with the frame repetition period for input into the background noise synthesizer 24.

On the other hand, a random pattern generated by the random pattern generator 23 is provided as a residual signal to the background noise generator 24. As in the case of the high efficiency speech decoder 26, the background noise synthesizer 24 is formed by a so-called speech synthesis filter, which uses the applied residual (i.e., random pattern) as an excitation signal and synthesizes the background noise under control of the prediction coefficients, the output level being controlled by the power information.

When notified of the detection of the postamble in the unique word detector 21, the suppressor/switcher controller 25 changes over the switch 32 at the input side of the D/A converter 33, through which the background noise generated in the background noise synthesizer 24 is output, in place of the speech output which is provided from the high efficiency speech decoder 26 via the output speech suppressor 27. Upon each reception of the postamble in the silent duration, the prediction coefficients and the power information in the background noise parameter memory 22 are updated with background noise parameters received in the frame subsequent to the postamble. Hence, the same parameters are repeatedly provided to the background noise synthesizer 24 with the frame period until the contents of the memory 22 are updated. The reason for which the received residual is not used for the synthesis of the background noise is that the repeated use of the same residual synthesizes a jarring noise having its repetition period component.

Figure 7:
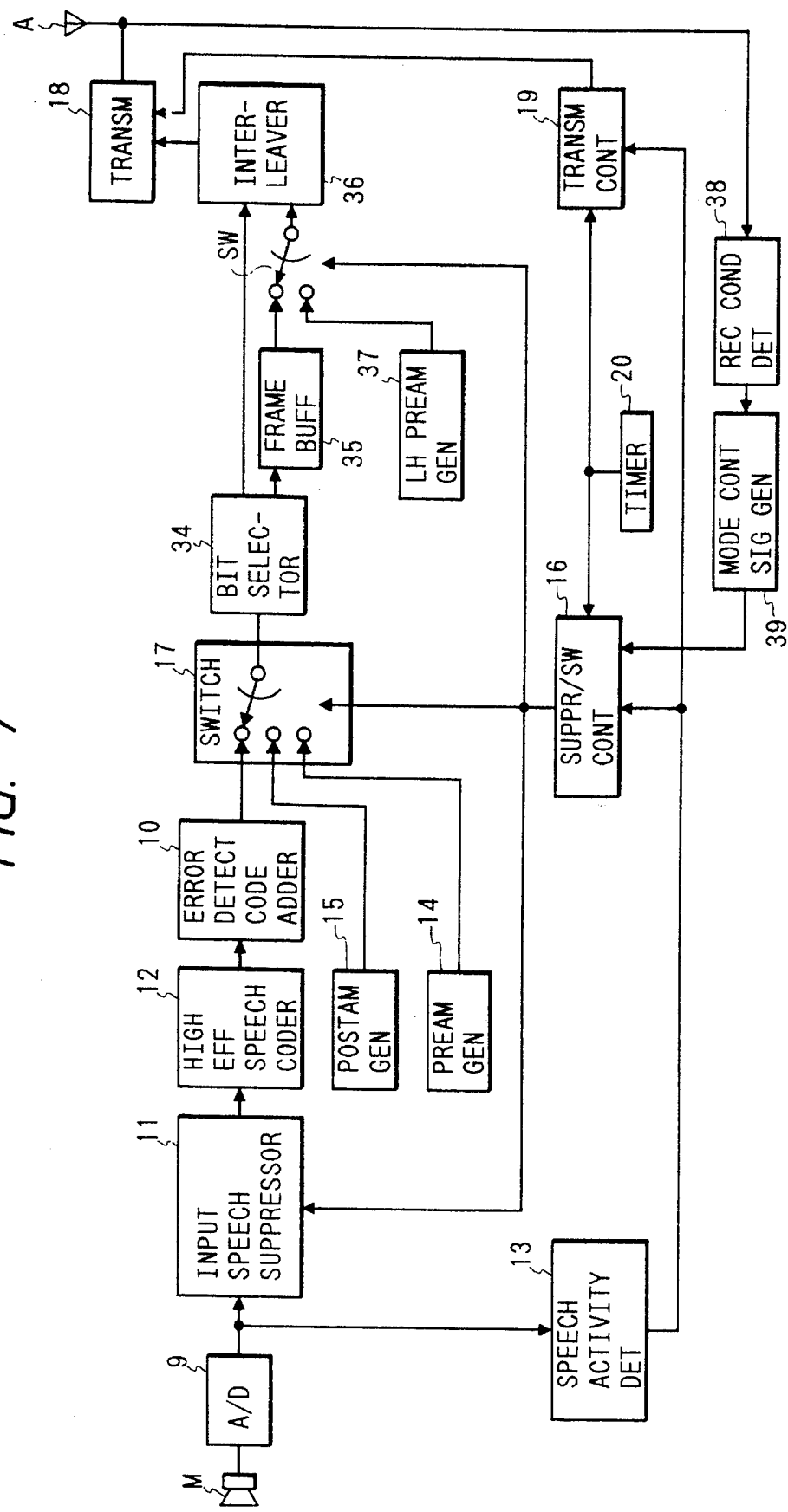
FIG. 7 is a block diagram of another example of the transmitting unit.

FIG. 7 illustrates in block form another example of the transmitting unit according to the present invention, in which the parts corresponding to those in FIG. 1 are identified by the same reference numerals and characters. In this example the coded data of each frame is interleaved into two frames. Between the data switch 17 and the transmitter 18 in the FIG. 1 embodiment there are provided: a bit selector 34 which distributes the coded data bit string of each frame into two bit strings; a frame buffer 35 which delays one of the bit strings for one frame period; a frame buffer switch SW which selectively outputs either the output of the frame buffer 35 or the output of a latter half preamble generator 37; and an interleaver 36 which couples the other bit string and the output of the switch SW. Moreover, there are provided a receiving condition detector 38 for detecting the receiving condition at the transmitting side and a mode control signal generator 39 for generating a transmission mode control signal on the basis of the detected receiving condition. The bit selector 34 may distribute the coded data of each frame into two bit strings, for instance, even- and odd-numbered bit strings, but in this embodiment the coded data bit strings of each frame is distributed into former and latter halves.

Figure 8:
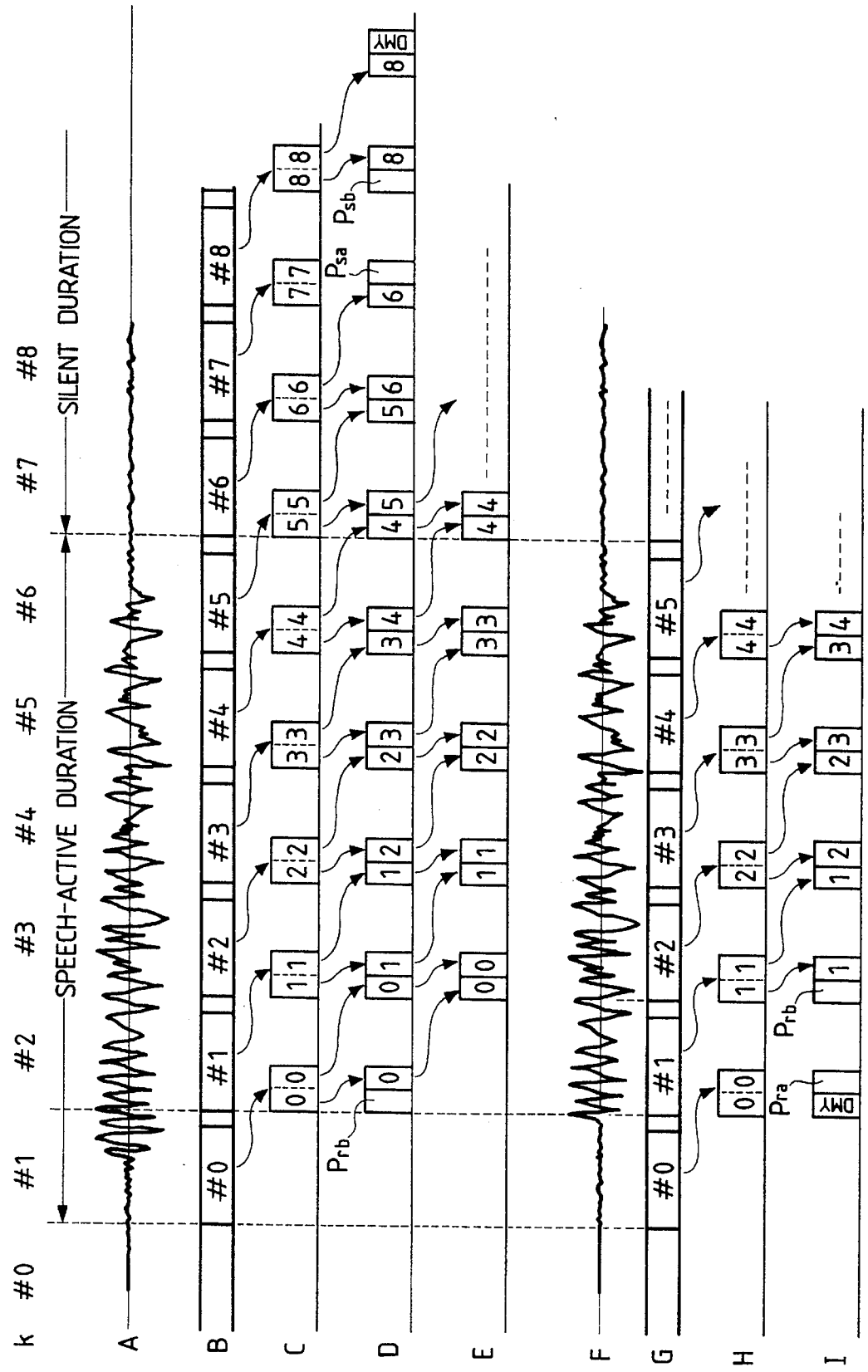
FIG. 8 is a timing chart for explaining the operation of the unit shown in FIG. 7.

Referring now to FIG. 8, the transmitting operation of the FIG. 7 embodiment will be described. A speech signal (Row A) from the microphone M is converted by the A/D converter 9 to a digital speech signal. As in the case of FIG. 1, the digital speech signal is provided via the input speech suppressor 11 to the high efficiency speech coder 12, wherein it is coded into frames, each having a 20 mS duration, for instance, at the timing shown on Row B. The coded digital speech signal is then appended with the error detecting code in the error detecting code adder 10.

In this embodiment, the communication condition, for example, the receiving condition at the transmitting side (a receiving unit is provided at the transmitting side as well, though not shown) is monitored and the transmission mode is switched according to the communication condition. In the FIG. 7 embodiment the receiving condition detector 38 connected to the antenna A measures, for example, the receiving level or a channel error rate, and when the measured receiving level is below a predetermined value, or when the channel error rate is above a predetermined value, the mode control signal generator 39 decides that the communication condition has deteriorated more than prescribed and then yields a mode switch control signal. When the communication condition is better than prescribed, such a transmission mode as shown on Rows A, B, C and D in FIG. 8 is executed. That is, the input speech suppressor 11 provides the input speech signal to the high efficiency speech coder 12 intact without suppressing its level, and as long as the transmitting unit is in operation, the coder 12 always codes the input signal for each frame at the timing depicted on Row B and provides the coded output at the timing shown on Row C.

When the start of the speech-active duration (the speech starting frame #1) is detected by the speech activity detector 13, the sending of the coded data is initiated in the immediately subsequent frame #2. In this instance, as shown on Row D, in the former half of the first sending frame, a latter half preamble Prb from the latter half preamble generator 37 is selected by the switch SW and output from the interleaver 36, and in the latter half of the frame, the former half of the coded speech of the frame #0 immediately preceding the speech starting frame #1, provided from the bit selector 34, is output from the interleaver 36. At this time, the latter half of the coded speech of the frame #0 is retained in the frame buffer 35. In the period of the frame #3 the latter half of the code of the speech frame #0, provided from the frame buffer 35, and the former half of the code of the speech frame #1, provided from the bit selector 34, are interleaved with each other in the interleaver 36, thereafter being transmitted as shown on Rows C and D.

Similarly, the former half of the coded speech of each of the subsequent speech frames is interleaved with the latter half of the coded speech of the preceding frame and the latter half is interleaved with the former half of the coded speech of the immediately succeeding frame. In this transmission mode, since the former half of the preamble is not sent as mentioned above, the preamble detecting rate at the receiving end decreases accordingly, but this does not matter when the communication condition is good. Furthermore, since the frame #0 (the background noise frame) immediately preceding the speech-active duration is coded and transmitted, the decoded result of this coded background noise can be used to decode the next speech starting frame #1 at the receiving end as shown on Row E, and no abnormal sound is produced.

In the case where the communication condition is poorer than prescribed, the transmission mode control signal is generated by the mode control signal generator 39 and applied to the suppressor/switcher controller 16. In this state the speech starting frame of the input speech signal, shown on row A in FIG. 8, is suppressed by the input speech suppressor 11 as shown on Row F in FIG. 8. In order to enhance the preamble detecting rate at the receiving end because the communication condition is bad, the preamble in its entirety, generated by the preamble generator 14, is split by the bit selector 34 into former and latter halves, which are separately transmitted in two transmission frames. That is, when the speech activity detector 13 detects the beginning of the speech-active duration (i.e. the speech starting frame), the suppressor/switcher controller 16 responds to the detection to control the switch 17, through which the preamble from the preamble generator 14 is provided to the bit selector 34. As a result, the former half Pra of the preamble is immediately sent out from the interleaver 36 in the latter half of the frame structure or configuration of the transmission frame #2, as shown on Row I in FIG. 8. At this time, data remaining in the frame buffer 35 is discharged therefrom and inserted as a dummy DMY in the former half of the sending frame, and at the same time, the latter half of the preamble is newly stored in the frame buffer 35.

In the next transmission frame #3 the switch 17 is connected to the coder 12 side, and as shown on Rows H and I in FIG. 8, the former half of the speech coded data of the speech frame #1 is interleaved by the interleaver 36 with the latter half of the preamble provided from the frame buffer 35, thereafter being sent out. In the subsequent transmission frame #k the former half of coded data of the speech frame #k-2 from the bit selector 34 is interleaved with the former half of coded data of the speech frame #k-3 from the frame buffer 35 and then transmitted. Thus, since in this transmission mode the communication condition is not good, the preamble detecting rate is improved by splitting the preamble into former and latter halves and sending them in different transmission frames. With this method, however, the coded data of the speech frame #0 prior to the speech starting frame cannot be sent. (This can be done by increasing the transmission delay but is not preferable to conversational communication.) Hence, the level of the abnormal sound that is produced at the receiving end is lowered by transmitting the speech starting frame #1 after suppressing it.

In either of the two transmission modes described above, when the speech-active duration ends in the frame #k, the postamble from the postamble generator 15 is provided via the switch 17 to the bit selector 34, wherein it is distributed into former and latter halves Psa and Psb as shown on Row D in FIG. 8. In transmission frames #k+2 and #k+3 the former half Psa and the latter half Psb of the postamble are concatenated with the latter half of coded data of the corresponding speech frame and the former half of the next background noise coded data, thereafter being sent. In the subsequent frame #k+4 a combination of the latter half of the background noise coded data and the dummy data DMY is sent, after which the transmission is stopped. In the silent duration, former and latter halves of the postamble, separated at every fixed time T measured by the timer 20, are interleaved by the interleaver 36 with the dummy data DMY and the former half of the background noise coded data of the next frame, respectively. Thereafter a combination of the latter half of the background noise coded data and the dummy data DMY is sent.

Figure 9:
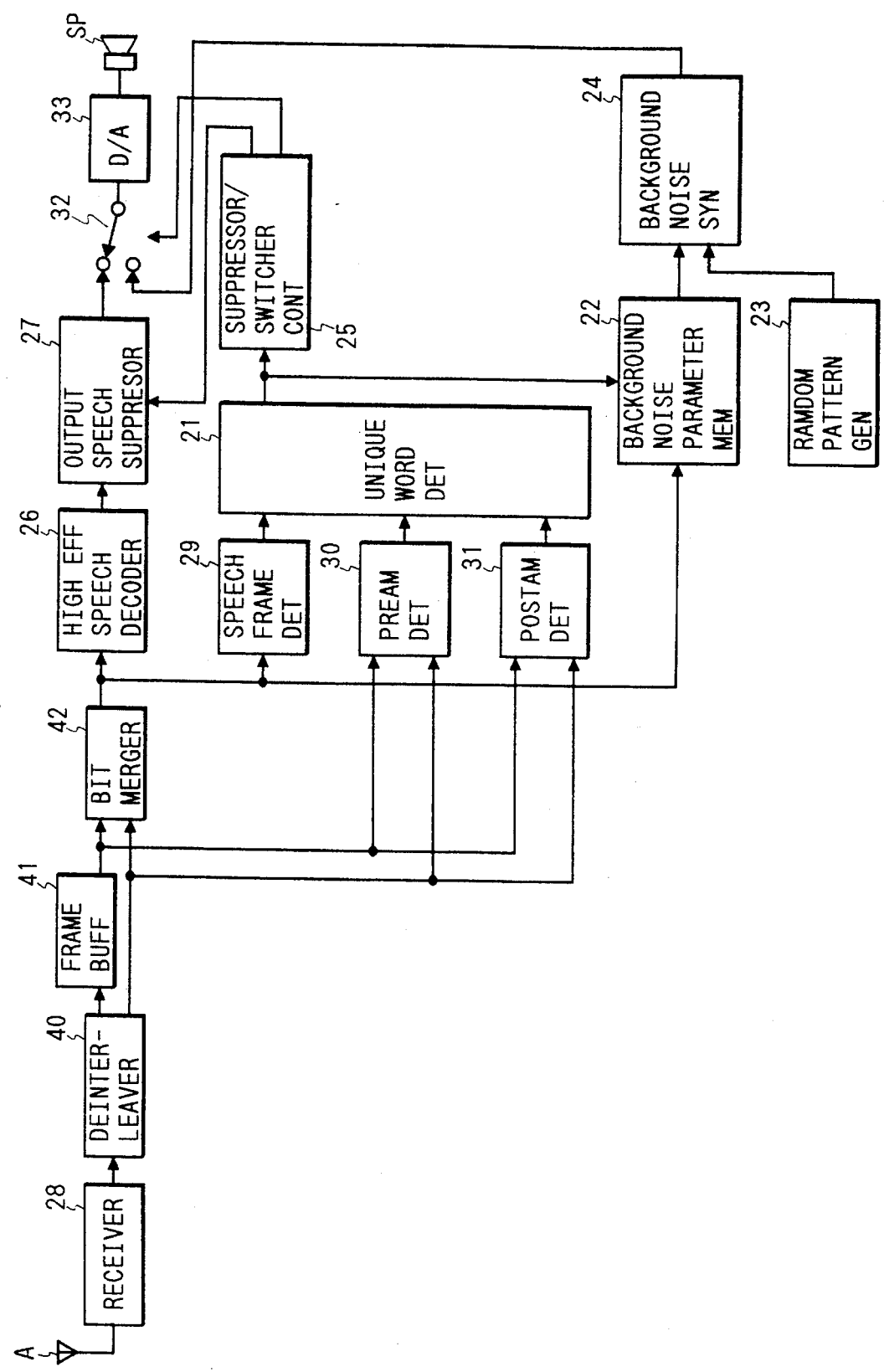
FIG. 9 is a block diagram of a receiving unit for use with the transmitting unit of FIG. 7.

FIG. 9 illustrates in block form another embodiment of the receiving unit according to the present invention. The parts corresponding to those in FIG. 6 are identified by the same reference numerals and characters. This embodiment is an application of the invention to the receiving unit of the transmission system which involves the two-frame interleaving described above with respect to FIG. 8. At the output side of the receiver 28 in FIG. 6 there are provided a deinterleaver 40, a frame buffer 41 and a bit merger 42 so as to deinterleave the two-frame interleaved data into bit string of the original frames. Moreover, the preamble detector 30 and the postamble detector 31 are adapted so that they can detect the preamble and the postamble, respectively, that is, former and latter halves of these unique words separately. Hence, even if either one of the former and latter halves of the unique word cannot be detected owing to a channel error, there is the possibility of the other being detected—this enhances unique word detecting rate accordingly.

The transmitted speech coded data is received by the antenna A and demodulated by the receiver 28. The demodulated burst bit string is separated by the deinterleaver 40 into a former-half burst bit string and a latter-half burst bit string. The latter-half burst bit string is provided to the bit merger 42, whereas the former-half burst bit string is also provided to the bit merger 42 but after being delayed by the frame buffer 41 for one frame period. The bit merger 42 merges the latter-half burst bit string of the previous transmission frame and the former-half burst bit string of the current transmission frame, both provided from the frame buffer 41, creating a burst bit string corresponding to the same speech frame. The burst bit string thus produced is applied to the high efficiency speech decoder 26 for decoding the speech code. The synthesis of the background noise in the silent duration is also performed in the same manner as in the case of FIG. 6.

As described above, the present invention permits VOX control of high reliability even in a channel wherein channel errors are induced. Moreover, also in the silent duration the background noise can be transmitted without impairing the power consumption reducing effect by the VOX control. Further, also in the case of employing the high efficiency speech coding system, it is possible to suppress the deterioration of the speech quality which is caused by the missing of the beginning of the speech.

It will be apparent that many modifications and variations may be effected without departing from the scope of the novel concepts of the present invention.

What is claimed is:

1. A method of communicating a speech signal over a communication medium, said speech signal including at least one speech-active duration in which actual speech exists and one silent duration in which no actual speech exists, comprising:

at a transmitting side, the steps of:

digitizing said speech signal into a digital speech signal;

analyzing said digital speech signal for each of successive frames thereof to determine whether or not each frame is in said speech-active duration, each of said frames having a fixed time period;

detecting a speech starting frame and a speech ending frame of said speech-active duration of said speech signal;

producing a preamble as a coded data indicative of the beginning of said speech-active duration of said speech signal in response to the detection of a speech starting frame of said speech-active duration;

coding said digital speech signal for each of successive frames thereof to produce a series of successive coded data of said speech signal, one coded data for each frame;

switching the coded data of said speech starting frame to said preamble, in response to the detection of a speech starting frame of said speech-active duration, to transmit it in place of the coded data of said speech starting frame;

transmitting said preamble and the successive coded data of said speech signal subsequent to said speech starting frame in the form of a series of successive frames;

stopping the transmitting of the successive coded data of said speech signal in response to the detection of a speech ending frame of said speech-active duration, and transmitting a postamble as a coded data indicative of the beginning of said silent duration of said speech signal; and at a receiving side, the steps of:

receiving the successive coded data of said speech signal with said preamble at the head thereof and said postamble at the tail thereof transmitted from said transmitting side;

decoding said received successive coded data of said speech signal to produce decoded results;

detecting said coded data of said actual speech which exists in said speech-active duration from said received successive coded data of said speech signal;

detecting said preamble from said received successive coded data of said speech signal and outputting the decoded results of said coded actual speech data subsequent to said detected preamble as a speech signal; and deciding, when a predetermined number of successive coded actual speech data have been detected without having detected a preamble preceding thereto, that the decoded results of said coded actual speech data are in a speech-active duration and outputting the decoded results of said coded actual speech data as a speech signal.

2. The method of claim 1 wherein said step of coding said speech signal further includes appending an error detecting code to each of said successive coded data of said speech signal, said coded data of said speech signal with said error detecting code appended thereto being transmitted from said transmitting side, and said step of transmitting said preamble being a step of transmitting said preamble with an error detecting code appended thereto which is always detected as an error code when detected at the receiving side.

3. The method of claim 1 wherein said step of coding said speech signal at said transmitting side encodes said speech signal frame by frame into a series of successive coded data each containing a prediction coefficient, a residual and power information; said transmitting side steps further including a step of transmitting said postamble and the coded data of a frame comprising a background noise of said speech signal in said silent duration thereof at regular time intervals after said silent duration has started; and said receiving side steps further including generating a random pattern, storing in memory means, each time said postamble in said silent duration is detected, said power information and said prediction coefficient contained in the coded data of the frame of said speech signal received subsequent to said detected postamble, synthesizing a background noise using said random pattern as a residual signal and on the basis of said prediction coefficient and said power information repeatedly read out of said memory means at intervals of the time period of said frame in said silent duration, and outputting said background noise.

4. The method of claim 3 wherein said receiving side steps further include a step of suppressing the level of the actual speech data of a first frame of said speech-active duration to be outputted when the state in which said synthesized background noise is being outputted is changed to the state in which the decoded actual speech data of said speech-active duration is outputted.

5. The method of claim 1, 2 or 3 wherein said transmitting side steps further include a step, before said coding step, of suppressing the level of the actual speech data of said speech starting frame of the speech signal to be coded from which frame said speech-active duration is started.

6. The method of claim 5 wherein said receiving side steps further include a step of suppressing the level of said decoded actual speech data of either a frame of said speech signal subsequent to the detected preamble or a frame of said speech signal in which it is decided that said speech-active duration has been started, and then outputting said suppressed actual speech data.

7. The method of claim 1, 2 or 3 wherein said transmitting step of said transmitting side comprises a step of interleaving the coded data of each frame of said speech signal to be transmitted by splitting said coded data of each frame into at least two pieces of coded data and distributing said split pieces of coded data into plural frames to produce at least two burst signals, and transmitting said at least two burst signals; said receiving side steps further including a step, before said coding step, of de-interleaving the received at least two burst signals by distributing them back to said coded data of each frame of said speech signal; and said preamble detecting step of said receiving side decides that said preamble has been detected when one of said at least two pieces of preamble distributed into said at least two burst signals has been detected.

8. The method of claim 7 wherein said step of transmitting said preamble at said transmitting side comprises a step of interleaving said preamble by multiplexing a latter half of said preamble and a former half of the coded data of a frame of said speech signal immediately preceding said speech starting frame of said speech-active duration, and transmitting said multiplexed data as a burst signal of a frame of said speech signal to be transmitted immediately after the detection of said speech-active duration.

9. The method of claim 7 wherein said transmitting side steps further include a step of detecting a communication condition, and when the detected communication condition is better than a prescribed condition, a latter half of said preamble is used; and said step of transmitting said preamble and the successive coded data of said speech signal at said transmitting side comprises a step of transmitting, subsequent to said latter half of said preamble, a series of successive coded data of said speech signal starting at a frame thereof immediately preceding said speech starting frame of said speech-active duration after said series of successive coded data of said speech signal have been interleaved, or comprises, when said detected communication condition is poorer than said prescribed condition, a step of suppressing the level of the active speech of said speech starting frame prior to coding said speech signal and a step of transmitting said preamble and the successive coded data of said speech signal having said speech starting frame suppressed after they have been interleaved.

10. A speech signal transmitting unit for transmitting speech signals over a communication medium, comprising:

means for digitizing an inputted speech signal into a digital speech signal, said input speech signal having at least one speech-active duration in which actual speech exists and one silent duration in which no actual speech exists;

speech-active duration detecting means for analyzing said digital speech signal for each of successive frames to determine whether or not each frame is in said speech-active duration, and for detecting a speech starting and a speech ending frame of said speech-active duration from said successive frames, each of said frames having a time period defined by a predetermined number of sample points at equal intervals;

coding means for coding said digital speech signal for each of successive frames and outputting a series of successive coded data of said speech signal, one coded data for each frame;

preamble generating means for generating a preamble as a predetermined pattern of a coded data that indicates the start of said speech-active duration of said speech signal;

postamble generating means for generating a postamble as a predetermined pattern of a coded data that indicates the start of said silent duration of said speech signal;

suppressing means responsive to the detected output of said speech-active duration detecting means for suppressing the level of said speech starting frame of said speech-active duration of said speech signal before said speech signal is applied to said coding means;

data switching means operative to normally deliver the successive coded data outputted from said coding means, said data switching means being operative in response to the detection of the speech starting frame by said speech-active duration detecting means to output said preamble in place of the coded data of said speech starting frame outputted from said coding means and then to restart delivery of the coded data of the successive frames of said speech signal subsequent to said speech starting frame outputted from said coding means, and being operative in response to the detection of the speech ending frame by said speech-active duration detecting means to output said postamble in place of the coded data of a frame outputted from said coding means after the coded data of said speech ending frame has been delivered;

timer means for outputting a time signal at regular time intervals in said silent duration of said speech signal after the transmission of said postamble;

transmitter means for transmitting said preamble, said successive coded data of said speech signal outputted from said coding means, and said postamble in the form of successive frames over a communication medium; and transmission control means responsive to the detected output of said speech-active duration detecting means and said time signal from said timer means for allowing the transmission of said postamble and the coded data of a frame of said speech signal subsequent to said postamble at said regular time intervals in said silent duration and for stopping the transmission of said speech signal for the remaining time period in the silent duration.

11. The speech signal transmitting unit of claim 10 wherein said suppressing means includes: delay means for delaying the digital signal of a frame of said speech signal immediately preceding a current frame the digital signal of which is inputted thereinto by the time period of one frame by holding the digital signal of said immediately preceding frame for said one frame time period and thereafter outputting it; and means, when said immediately preceding frame is said speech starting frame, for combining levels of each sample in said current frame and each sample in said immediately preceding frame from said delay means at respective corresponding sample positions in their frames at respective rates depending upon their sample positions to obtain samples for one frame, the levels of which are suppressed and for outputting said level-suppressed samples as samples in said current frame.

12. The speech signal transmitting unit of claim 10 wherein said suppressing means includes: latch means for holding the digital signal of a current frame which is inputted thereinto for one frame time period; coefficient calculating means for calculating a coefficient for each sample position in said current frame by weighting a level changing ratio which is determined by the power of said speech starting frame and the power of a frame immediately preceding said speech starting frame in accordance with the respective sample positions in their frames; and means for multiplying each sample value of said current frame latched in said latch means by said coefficient corresponding thereto to obtain samples for one frame, the levels of which are suppressed and for outputting said level-suppressed samples as samples in said current frame.

13. The speech signal transmitting unit of claim 10 further comprising interleave means at the output side of said data switching means for interleaving each of the successive coded data outputted therefrom in two successive frames.

14. The speech signal transmitting unit of claim 13 wherein said interleave means includes: bit select means for distributing each of the successive coded data outputted from said data switching means into a former half bit string and a latter half bit string for each frame; frame buffer means for holding said latter half bit string of each frame for one frame time period and for outputting it; and merge means for merging said latter half bit string of each frame from said frame buffer means as a former half bit string of an interleaved frame and said former half bit string of a frame from said bit select means immediately succeeding said each frame as a latter half bit string of said interleaved frame.

15. The speech signal transmitting unit of claim 14 further comprising: communication condition detecting means for detecting a communication condition; transmission mode switch control signal generating means for outputting a transmission mode switch control signal when the communication condition detected by said communication condition detecting means is poorer than a prescribed condition; and control means operative, when said mode switch control signal is not generated, to assume that the suppression of the level of said speech starting frame by said suppressing means is not performed, that said data switching means selects and outputs the successive coded data from said coding means, and that said bit select means responds to the start of said speech-active duration to select said latter half of said preamble, and operative, when said transmission mode switch control signal is generated, to assure that the suppression of the level of said speech starting frame by said suppressing means is performed, that said data switching means selects and outputs, in response to the start of said speech-active duration, said preamble in place of said speech starting frame, and that said bit select means selects the output of said frame buffer means at all times.

16. A speech signal receiving unit for receiving a series of successive coded data of a speech signal transmitted in the form of a series of successive frames from a transmitting side over a communication medium, said speech signal including at least one speech-active duration in which actual speech exists and one silent duration in which no actual speech exists, each of said frames having a fixed time period, said speech signal receiving unit comprising:

receiving means for receiving said series of successive coded data of said speech signal;

decoding means for decoding said received series of successive coded data of said speech signal into a decoded speech signal;

actual speech coded data detecting means for detecting successive coded data of said actual speech in said speech-active duration of said speech signal from said received series of successive coded data of said speech signal;

preamble detecting means for detecting a preamble as a predetermined pattern of a coded data indicative of the beginning of said speech-active duration from said received series of successive coded data of said speech signal;

postamble detecting means for detecting a postamble as a predetermined pattern of a coded data indicative of the beginning of said silent duration from said received series of successive coded data of said speech signal;

background noise parameter memory means for storing, in response to the detection of said postamble, power information and a prediction coefficient contained in coded data of a background noise of a frame in said silent duration of said speech signal subsequent to said postamble frame transmitted from said transmitting side, as background noise parameters;

random pattern generating means for generating a random pattern;

background noise synthesizing means controlled by said background noise parameters read out of said background noise parameter memory means and supplied with said random pattern as a residual signal, to synthesize a background noise;

switching means for selectively outputting one of said decoded speech signal and said background noise; and speech switching control means operative to cause said switching means to select and output said background noise from said background noise synthesizing means in response to the detection of said postamble, and operative, when said preamble detecting means detects said preamble or when said preamble detecting means does not detect said preamble but said actual speech coded data detecting means detects a predetermined number of successive coded data of said actual speech in succession, to cause said switching means to select and output said decoded speech signal from said decoding means.

17. The speech signal receiving unit of claim 16 further comprising suppressing means at the output side of said decoding means, for suppressing the level of the actual speech data in said speech starting frame of said speech signal from said decoding means in response to the detection of said preamble.

18. The speech signal receiving unit of claims 16 or 17 which further comprises: bit select means for distributing each of said received successive coded data of said speech signal into a former half bit string and a latter half bit string for each frame; frame buffer means for holding said latter half bit string of each frame for the time period of one frame and for outputting it; and merge means for merging said latter half bit string of each frame from said frame buffer means as a former half bit string of an interleaved frame and said former half bit string of a frame from said bit select means immediately succeeding each said frame as a latter half bit string of said interleaved frame to obtain successive coded data each corresponding to one frame of said speech signal, and for outputting said successive data; and wherein said actual speech coded data detecting means is supplied with said successive coded data from said merge means to detect said actual speech coded data, said preamble detecting means includes means for deciding that said preamble is detected when at least one of former and latter halves of said preamble is detected from said former half bit string supplied thereto from said bit select means and said latter half bit string supplied thereto from said frame buffer means, and said postamble detecting means includes means for deciding that said postamble is detected when at least one of former and latter halves of said postamble is detected from said former half bit string supplied thereto from said bit select means and said latter half bit string supplied thereto from said frame buffer means.

* * * * *

UNITED STATES PATENT AND TRADEMARK OFFICE
CERTIFICATE OF CORRECTION

PATENT NO. :   5,553,190
DATED       :   September 3, 1996
INVENTOR(S) :   Tomoyuki Ohya et al.

It is certified that error appears in the above-identified patent and that said Letters Patent is hereby corrected as shown below:

On the title page:

Item: [73], the second Assignee has been omitted. After "NTT Mobile Communications Network, Inc., Tokyo, Japan", insert --and Nippon Telegraph and Telephone Corporation, Tokyo, Japan--.

Signed and Sealed this

Twenty-sixth Day of August, 1997

Attest:

BRUCE LEHMAN

Attesting Officer

Commissioner of Patents and Trademarks